United States Patent [19]
Futter

[11] 4,168,674
[45] Sep. 25, 1979

[54] MEANS CONTROLLING TABLET TUMBLER

[75] Inventor: Bernard V. Futter, Liverpool, England

[73] Assignee: Evans Medical Limited, Liverpool, England

[21] Appl. No.: 595,128

[22] Filed: Jul. 11, 1975

[30] Foreign Application Priority Data

Jul. 16, 1974 [GB] United Kingdom ............... 31414/74

[51] Int. Cl.² .................................................. B05C 3/08
[52] U.S. Cl. .................................... 118/695; 118/704; 118/19; 328/75; 427/3
[58] Field of Search ................... 118/5, 19, 20, 7, 303, 118/418, 58; 137/487.5; 328/69, 75; 68/12; 427/242, 3, 8–10

[56] References Cited

U.S. PATENT DOCUMENTS

| 3,794,070 | 2/1974 | Klem et al. | 137/487.5 |
| 3,914,581 | 10/1975 | Gilson | 137/487.5 |

FOREIGN PATENT DOCUMENTS

| 1203213 | 8/1970 | United Kingdom | 118/19 |
| 1264451 | 2/1972 | United Kingdom | 427/242 |

*Primary Examiner*—Morris Kaplan
*Attorney, Agent, or Firm*—McAulay, Fields, Fisher & Goldstein

[57] ABSTRACT

Tablets are coated by tumbling a batch of tablets in a rotating coating pan and subjecting the tablets while they are in the pan to a plurality of treatment steps. Each of these treatment steps consists of a plurality of treatment cycles each including a dosing period in which a measured quantity of tablet coating liquid is introduced into the pan, a drying period in which drying air is supplied to the interior of the pan and an intermediate mixing period during which the tablets tumble in contact with the already introduced coating liquid for a pre-set time and no drying air is supplied to the pan. The temperature of the batch of tablets being coating in the coating pan is sensed by a sensor. The temperature of the batch of tablets at the end of a pre-set time interval from the commencement of the drying period is stored in a memory device as a reference temperature. Whenever during any one cycle there is a preselected difference between the sensed temperature of tablets in the pan and the reference temperature stored in the memory devices a signal is produced. This signal is utilized to terminate the drying period of such cycle and to initiate the dosing period of the next cycle.

4 Claims, 2 Drawing Figures

MEANS CONTROLLING TABLET TUMBLER

BACKGROUND OF THE INVENTION

This invention relates to the coating of tablets. It is to be understood that the expression "tablets" as used herein is intended to refer solely to articles having a tablet-like shape which can be tumbled in a coating pan and includes articles having a ball-like, semi-spherical, torpedo-like or other shape. The definition is not restricted to pharmaceutical dosage forms, but may relate to articles coated in the confectionary or other industries.

In the pharmaceutical industry it is well known to provide a core tablet containing a medicament with a sugar coating by tumbling a quantity of core tablets in a pan which rotates about an axis which may be inclined with respect to the horizontal. A coating liquid, which may be a solution or suspension, is applied to the mass of tablets in the pan and as the pan rotates the surface of the tables become evenly coated by their tumbling action in contact with the coating liquid. The application is then dried in an air stream. In general, a large number of separate applications is necessary before a satisfactory tablet is finally produced and whilst many of these applications are identical, a coating method may also include applications of different volumes or of different coating liquids. A similar technique is used for the manufacture of some sweetmeats.

The coating of tablets in this known way is not easy to control and requires skilled operators giving constant attention, especially when working to the high standards of quality control demanded by the pharmaceutical industry. Hence the process is expensive in terms of time and labour.

An object of the invention is to simplify and standardise the coating of tablets and provide a more efficient coating method in terms of time, resources and quality of finished product as compared with known methods.

BRIEF SUMMARY OF THE PRESENT INVENTION

According to the present invention there is provided, an apparatus for coating tablets comprising the steps of tumbling a batch of tablets in a rotating coating pan and subjecting the tablets while they are in the pan to a plurality of treatment steps each of which consists of a plurality of treatment cycles each including a dosing period in which a measured quantity of tablet-coating liquid is introduced into the pan, a drying period in which drying air is supplied to the interior of the pan and an intermediate mixing period during which the tablets tumble in contact with the already introduced coating liquid for a pre-set time and no drying air is supplied to the pan, sensing the temperature of the batch of tablets being coated in the coating pan, storing in a memory device as a reference temperature the temperature of the batch of tablets at the end of a pre-set time interval from the commencement of the drying period, continuing the sensing of the temperature of the tablets in the pan and producing a signal whenever during any one cycle there is a preselected difference between the sensed temperature of tablets in the pan and the reference temperature stored in the memory device and utilising such signal to terminate the drying period of such cycle and to initiate the dosing period of the next cycle.

The invention also provides an apparatus for coating tablets comprising a rotatable coating pan capable of receiving a batch of tablets to be coated, means for supplying coating liquid to a batch of tablets inside the pan, means for supplying drying air to the interior of the pan, and a control unit operable to control the operation of both of the supply means during each of a plurality of treatment cycles each of which includes a dosing period in which a measured quantity of liquid is supplied to the pan, a drying period in which drying air is supplied to the interior of the pan and an intermediate period during which the tablets tumble in the pan in contact with the already applied liquid for a pre-set time and no drying air is supplied to the pan; the said control means including means automatically operable when the last of one pre-set number of cycles has been completed to initiate operation of both supply means for another preset number of cycles in which the same or different measured quantities of the same or a different liquid are supplied, a temperature detector arranged to sense and respond to the temperature of a batch of tablets in the pan, a memory device in which is stored information as to a reference temperature which is the temperature of the batch of tablets in the pan determined by the detector at the end of a pre-set time interval from the commencement of the drying period, and means responsive to a preselected difference between the temperature sensed by the detector and the said reference temperature stored in the memory device to terminate the drying period of the cycle in which the difference occurs and to initiate the dosing period of the next cycle.

DESCRIPTION OF PREFERRED EMBODIMENTS

Figure 1:
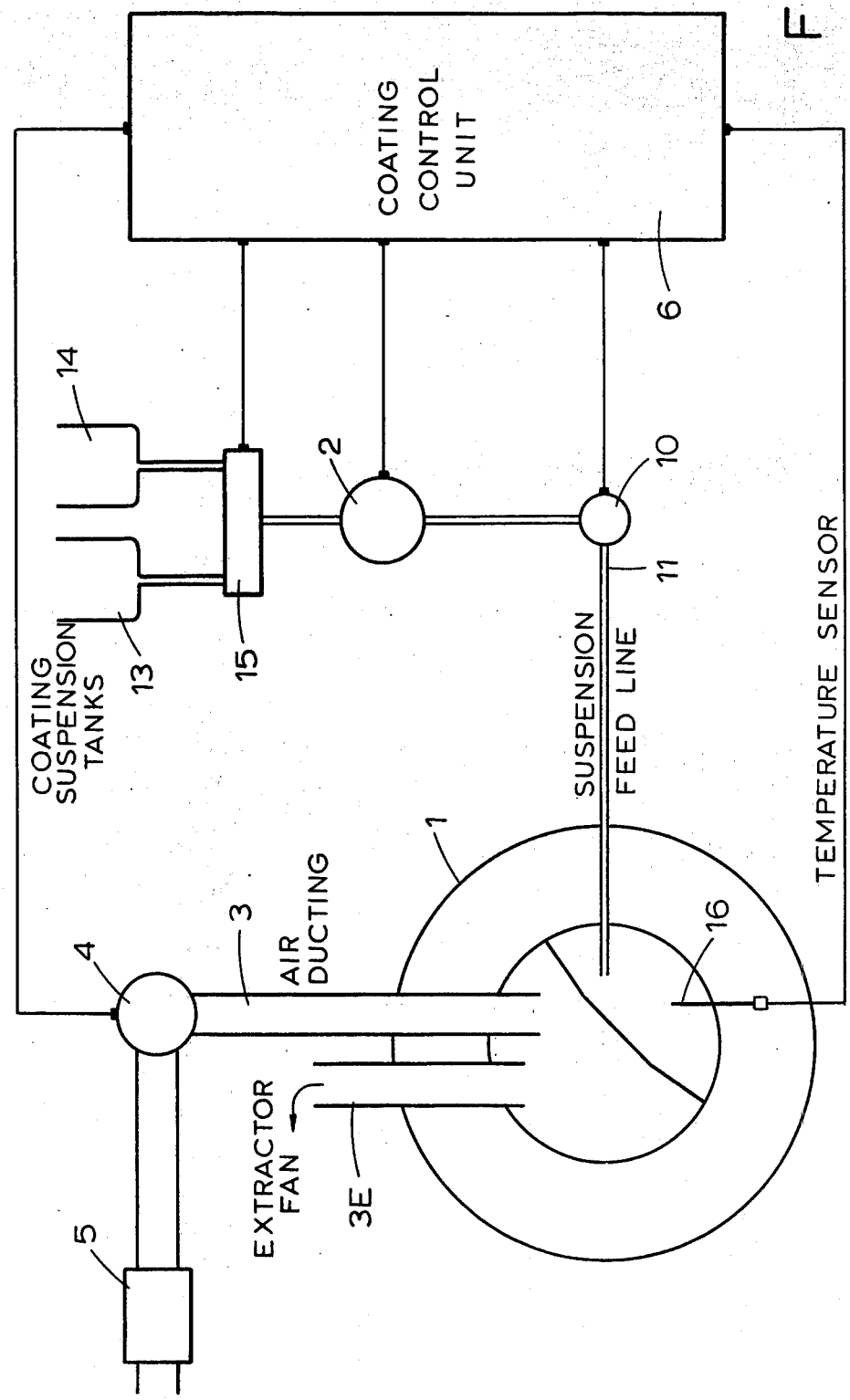
FIG. 1 is a schematic diagram of a tablet coating apparatus.

In the illustrated embodiment of the invention an apparatus for coating tablets comprises an open coating pan 1 which is rotatable by an electric motor (not illustrated) about an axis which is inclined with respect to the horizontal. Core tablets to be coated are placed in the pan and are then tumbled by rotation of the pan. A pre-selected volume of a coating liquid is pumped into the pan 1 by a peristaltic or other suitable pump 2. The volume of coating liquid pumped into the pan depends on the nature of the liquid to be applied, the stage of the coating operation and the quantity of tablets in the pan. After the tablets have been tumbled in the coating liquid for a pre-determined time hot air is blown through a duct 3 on to the tablets while they are being tumbled to dry the surfaces of the tablets. The hot air supply is controlled by a butterfly valve 4 in the hot air duct 3 which is continuously supplied with hot air from any suitable source 5 such as a heat exchanger and fan. An extractor duct 3E connected to an extractor fan (not shown) withdraws air from the interior of the pan 1.

Such a coating operation is known. The present invention provides a means for controlling the supply of coating liquid and the application of drying air to a reproducible standard.

Figure 2:
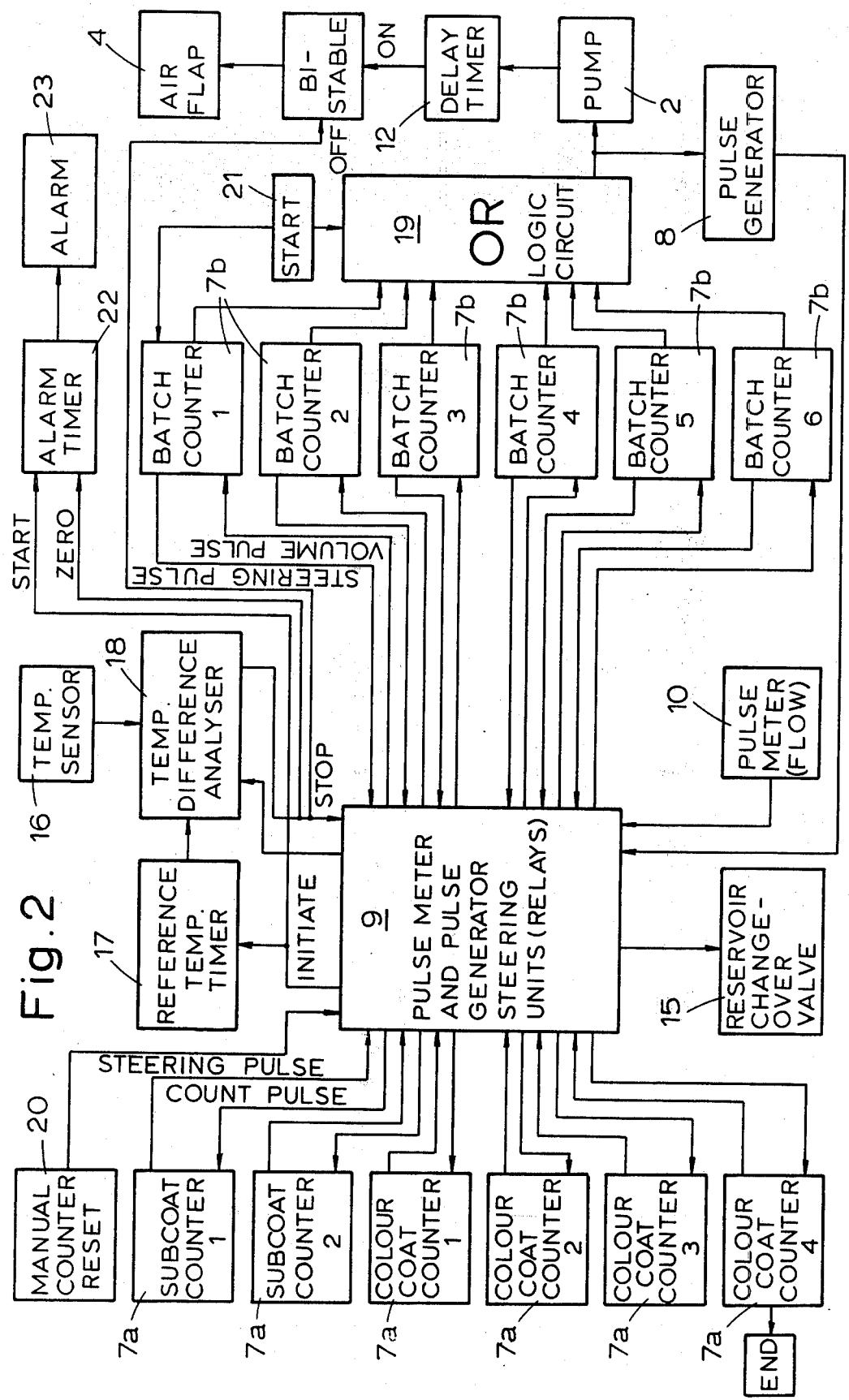
FIG. 2 is a block function diagram.

The control means 6 is illustrated in detail in FIG. 2 and comprises a sheet metal housing at the front face of which is a control panel. The housing contains a plurality of adjustable electronic counting devices 7a and 7b and electronic or mechanical timers together with a pulse generator which operate an arrangement of relays and switches in a unit 9 to switch the coating liquid supply pump on and off as desired and to open or close the valve 4 controlling the application of hot drying air to the interior of the pan 1. The counting devices 7 are arranged in pairs (the counters of each pair being designated "a" and "b" in a sequence of channels to provide a variable pre-set number of dosage applications of different pre-set volumes and of different coating liquids if required. All the counting devices 7 are adjustable and the first one 7a of each pair may be pre-set to produce a desired number of cycles. The second counting device 7b of each pair controls the volume of coating liquid to be applied during each cycle of the channel containing that pair by connecting to a pulsating flow meter 10 located in the coating liquid feed line 11. Each cycle includes three periods, namely a dosing period in which the pump 2 is switched on to pump coating liquid into a predetermined position or positions in the pan 1, and intermediate delay or mixing period in which the tablets are tumbled in the pan 1 after the dosage application and which is adjustable by means of a panel-mounted timer 12, and a drying period in which the valve 4 to the hot air supply duct 3 is automatically opened to permit drying air to be blown across the surface of the mass of tablets tumbling in the pan 1.

When the drying period of the last cycle in a particular channel has been completed the first counter 7a of the next channel is switched in to control a further number of cycles. The number of cycles controlled by this next counter 7a may be pre-set to the same as in the previous channel or the number can be different, but generally the second counting device 7b in this next channel is pre-set to deliver a different volume of coating liquid from that supplied by the first channel by counting a different number of volumetric pulses from the flow meter 10 before terminating the application of coating liquid. The intermediate mixing period and the drying period then proceed as before according to the mixing time initially pre-set, and the drying control conditions as hereinafter described. When the drying period of the last cycle of the last channel in the unit is completed the supply of both coating liquid and drying air is terminated.

A number of channels are operable to connect to the pump 2 a reservoir 13 of coating liquid associated with those channels. On passing from the last of these channels to the first of the next an alternative reservoir 14 may be automatically connected by operation of a changeover valve 15 to provide a different coating liquid for those channels.

The drying period of each cycle is controlled in accordance with the temperature of the tablets being tumbled. For this purpose a second stage control unit is associated with the first stage unit and is housed in the same sheet metal casing. This second stage control unit includes a thermocouple 16 or other temperature sensor which is inserted into the mass M of tablets in the pan 1, usually at a predetermined position of adequate sensitivity. The thermocouple 16 supplies to the second stage control unit a signal indicative of the temperature of the tablets being tumbled. The second stage control device includes a memory device 17/18 which stores information as to a reference temperature of the mass or batch M of tablets during the hot air application, this reference temperature being the temperature of the mass of tablets at the end of a pre-set time interval from the commencement of the drying period. This control unit is switched in by the first stage control unit at the drying period of the cycles controlled by the first stage unit. Once the second stage unit has been switched in it will on receipt of a signal from a temperature difference analyser 18 indicative of the attainment of a pre-selected difference in temperature (conveniently in the range 0.3° C. to 3° C.) of the tablets in the pan 1 from the reference temperature already stored in the memory device 17/18 operate to send a command signal to the first stage unit to terminate the drying period of that particular cycle so that a new cycle may be initiated. The control units are therefore ultimately concerned with temperature difference measurement, and hence moisture content, to give coated tablets of reproducible quality. The coating is not dependent on time since cycle times may vary with slight variation in drying conditions, and is not dependent on fixed temperature which cannot be related to residual moisture content of the mass of tablets.

The various periods in the cycles may be adjusted by suitable setting of the counting devices and timers on the control panel. These adjustments are made in any suitable way for example, by opening a transparent cover on the front of the control panel and once set the controls may be locked to prevent unauthorised further adjustment. Similary since all the counting devices and timers are automatically re-set after use, a programme for a particular batch size of a particular diameter tablet may be preset initially and locked in for as long as that product is on line. Changing the product may require a new programme to be preset.

The control panel is provided with indicator lamps (not shown) which are illuminated to show which channel is in operation and which stage of the cycle is in progress.

The control unit 6 includes an electronic logic circuit 19, a manual counting device re-set 20 and a start switch 21.

The control unit also includes an alarm or back-up timer 22 which is permanently preset for a desired time during which a single cycle should be completed. If this cycle is not completed within this pre-set time, an alarm 23 is triggered to call attention to some fault present. This alarm 23 can be either visual or audible and if desired can be arranged to shut down the entire apparatus.

What is claimed is:

1. An apparatus for coating tablets comprising a rotatable coating pan capable of receiving a batch of tablets to be coated; pump means for supplying coating liquids to the interior of the pan; means for supplying drying air to the interior of the pan; and a control means operable to control the operation of both of the supply means during each of a plurality of treatment cycles, the control means comprising: a timing device to supply a desired measured quantity of liquid, a flow meter and a pulse counter responsive to volumetric pulses delivered from the flow meter to supply the desired measured quantity of liquid, a plurality of pairs of counting devices, each pair of counting devices being operable to control the pump operation and the supply of drying air in a desired number of cycles, each pair of counting devices being operable when the last of a preset number of cycles has been completed to switch in another pair of counting devices operable to produce a further preset number of cycles and a last pair of counting devices being operable when the last of the cycles has been completed to terminate the supply of both the coating liquid and of drying air, the control means operating so as to provide an intermediate period between the operation of the dosing liquid pump and the supplying of drying air during which the tablets and the dose liquid in the pan are mixed together; a temperature detector arranged to sense and respond to the temperature of a batch of tablets and dosing liquid in the pan; a memory device suitable for storing information as to a reference temperature which is the temperature of a batch of tablets in the pan at the end of a preset time interval after the commencement of the drying period; and means responsive to a preselected difference between the temperature sensed by the detector and the reference temperature stored in the memory device to terminate the drying period of the cycle in which the difference occurs and to switch in the following pair of counting devices to initiate the dosing period of the next cycle.

2. The apparatus of claim 1 comprising in addition at least one reservoir for coating liquid in fluid flow connection to the pump.

3. The apparatus of claim 2 comprising a plurality of reservoirs for coating liquid and a changeover valve automatically operable to connect a selected reservoir with the pump.

4. The apparatus of claim 2 comprising in addition an alarm timing device which can be pre-set to desired time during which a single cycle should be completed, the set alarm timing device being arranged to initiate an alarm if the cycle is not completed within the pre-set time.

* * * * *